(12) United States Patent
Turner et al.

(10) Patent No.: US 6,330,318 B1
(45) Date of Patent: Dec. 11, 2001

(54) METHOD OF AND SYSTEM FOR INTERRUPTING AND PARKING CALLS IN A SWITCHED TELECOMMUNICATIONS NETWORK

(75) Inventors: Donald A. Turner, Plano, TX (US); Timothy A. Morgan, Roswell, GA (US); Franklin O. Shaffer, Herndon, VA (US); Ranga R. Dendi, Plano, TX (US)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/160,815

(22) Filed: Sep. 25, 1998

(51) Int. Cl.[7] .............................. H04M 3/42; H04M 1/80; H04M 3/56; H04M 3/58

(52) U.S. Cl. ........................ 379/201.01; 379/207.01; 379/215.01

(58) Field of Search ...................... 379/201, 202, 379/210, 211, 215, 201.01, 207.01, 210.01, 211.01, 211.02, 215.01

(56) References Cited

U.S. PATENT DOCUMENTS

| | | | |
|---|---|---|---|
| 4,720,850 | * 1/1988 | Oberlander et al. | 379/90.01 |
| 5,023,868 | * 6/1991 | Davidson et al. | 370/270 |
| 5,222,120 | * 6/1993 | McLeod et al. | 379/88.24 |
| 5,448,632 | * 9/1995 | Iyob et al. | 379/201 |
| 5,590,187 | * 12/1996 | Greenspan | 379/212 |
| 5,640,319 | * 6/1997 | Beuning et al. | 379/219 X |
| 5,764,748 | * 6/1998 | Rosenthal et al. | 379/215 |
| 5,825,867 | * 10/1998 | Epler et al. | 379/215 |
| 5,848,142 | * 12/1998 | Yaker | 379/215 |
| 5,864,614 | * 1/1999 | Farris et al. | 379/207 |

\* cited by examiner

Primary Examiner—Harry S. Hong

(57) ABSTRACT

A method of interrupting a call between two parties in a switched telecommunications. A monitoring switch monitors the call for a party initiated interrupt signal. Whenever the monitoring switch receives an interrupt signal initiated by its associated party, the monitoring switch initiates a call between the party initiating the interrupt signal and a serving platform, and parks the other party at a port of the monitoring switch. The monitoring switch then monitors the status of the call between the party initiating the interrupt signal and the serving platform, and the status of the parked call so that the parties may be reconnected at the conclusion of the call between the requesting party and the serving platform or informed if one of the parties disconnects before they are reconnected.

30 Claims, 3 Drawing Sheets

METHOD OF AND SYSTEM FOR INTERRUPTING AND PARKING CALLS IN A SWITCHED TELECOMMUNICATIONS NETWORK

FIELD OF THE INVENTION

The present invention relates generally to telephone call processing, and more particularly to a method of providing party initiated call interruption services in a switched telecommunications network, such as a long distance telephone network.

DESCRIPTION OF THE PRIOR ART

Private telephone systems and local telephone companies currently provide services that allow a caller to interrupt a call in progress. For example, local telephone companies provide Call Waiting service that alerts a caller with a special tone that there is an incoming call waiting for the caller. When the caller hears the special tone, the caller may take the incoming call by pressing and releasing the switch hook. Pressing and releasing the switch hook puts the first call affectively on hold and connects the caller to the incoming call. The caller can toggle back and forth between the original call and the incoming call by pressing and releasing the switch hook.

Another example of mid-call interruption services provided by local telephone companies is three-way calling, which allows a caller to be connected to two different parties at the same time. During a call to a first party, a caller can put that party on hold by pressing and releasing the switch hook. When the caller receives a dial tone, the caller can dial the number of the other party. When the other party answers, the caller and the other party can talk privately or the caller can add the first party into the conversation by pressing and releasing the switch hook. If either of the other parties disconnects, the conversation continues with the remaining party. When the caller hangs up, all other parties are disconnected.

Currently, there is no system by which long distance telephone carriers can provide mid-call interruption services. It is therefore an object of the present invention to provide a system for interrupting calls between two parties in a switched telecommunications network, such as a long distance telephone network.

SUMMARY OF THE INVENTION

The present invention provides a method of interrupting an original call between two parties in a switched telecommunications network in which each of the parties is associated with a switch of the network. A switch monitors the call for a party initiated interrupt signal, which is a dual tone multi-frequency (DTMF) sequence. Whenever the monitoring switch receives an interrupt signal, the monitoring switch initiates a new call between the party initiating the interrupt signal and a serving platform, and parks the other party to the original call at a port of the monitoring switch. The monitoring switch then monitors the status of the new call between the party initiating the interrupt signal and the serving platform, and the status of the parked original call.

Whenever the serving platform releases the requesting party, the monitoring switch determines whether or not the parked party is still connected. If the parked party is still connected, the switch reconnects the requesting party and the parked party. If the parked party is disconnected, then the monitoring switch informs the requesting party that the parked party has disconnected, and releases the original call to the parked party.

Whenever the requesting party disconnects, the switch determines whether or not the parked party is still connected. If the parked party is still connected, the monitoring switch informs the parked party that the requesting party has disconnected and releases the call to the parked party. Whenever the parked party disconnects, the monitoring switch determines whether or not the requesting party is still connected. If the requesting party is still connected, the monitoring switch waits until the serving platform releases the requesting party and then informs the requesting party that the parked party has disconnected.

The method of the present invention is preferably implemented with a call park table at the monitoring switch. When the monitoring switch initiates the call to the serving platform, the monitoring switch inserts in the call park table an identifier identifying the original call between the parties, an identifier identifying the new call between the requesting party and the serving platform, and an action code that identifies the status of the parked call.

When the monitoring switch receives a release message, the monitoring switch searches the call park table for a match between the identifier of the released call and the identifier of the original call between the parties or the identifier of the new call between the requesting party and the serving platform. If there is no match, the monitoring switch processes the release message in the normal way. Whenever the identifier of the released call matches the identifier of the new call between the requesting party and the serving platform, the monitoring switch checks the action code to determine whether or not the parked party is still connected. Whenever the parked party is still connected, the monitoring switch reconnects the requesting party and the parked party. Whenever the parked party is not still connected, the monitoring switch applies a call treatment informing the requesting party that the parked party has disconnected.

Private telephone systems and local telephone companies currently provide services that allow a caller to interrupt a call in progress. For example, local telephone companies provide Call Waiting service that alerts a caller with a special tone that there is an incoming call waiting for the caller. When the caller hears the special tone, the caller may take the incoming call by pressing and releasing the switch hook. Pressing and releasing the switch hook puts the first call effectively on hold and connects the caller to the incoming call. The caller can toggle back and forth between the original call and the incoming call by pressing and releasing the switch hook.

DESCRIPTION OF THE PREFERRED EMBODIMENT

Figure 1:
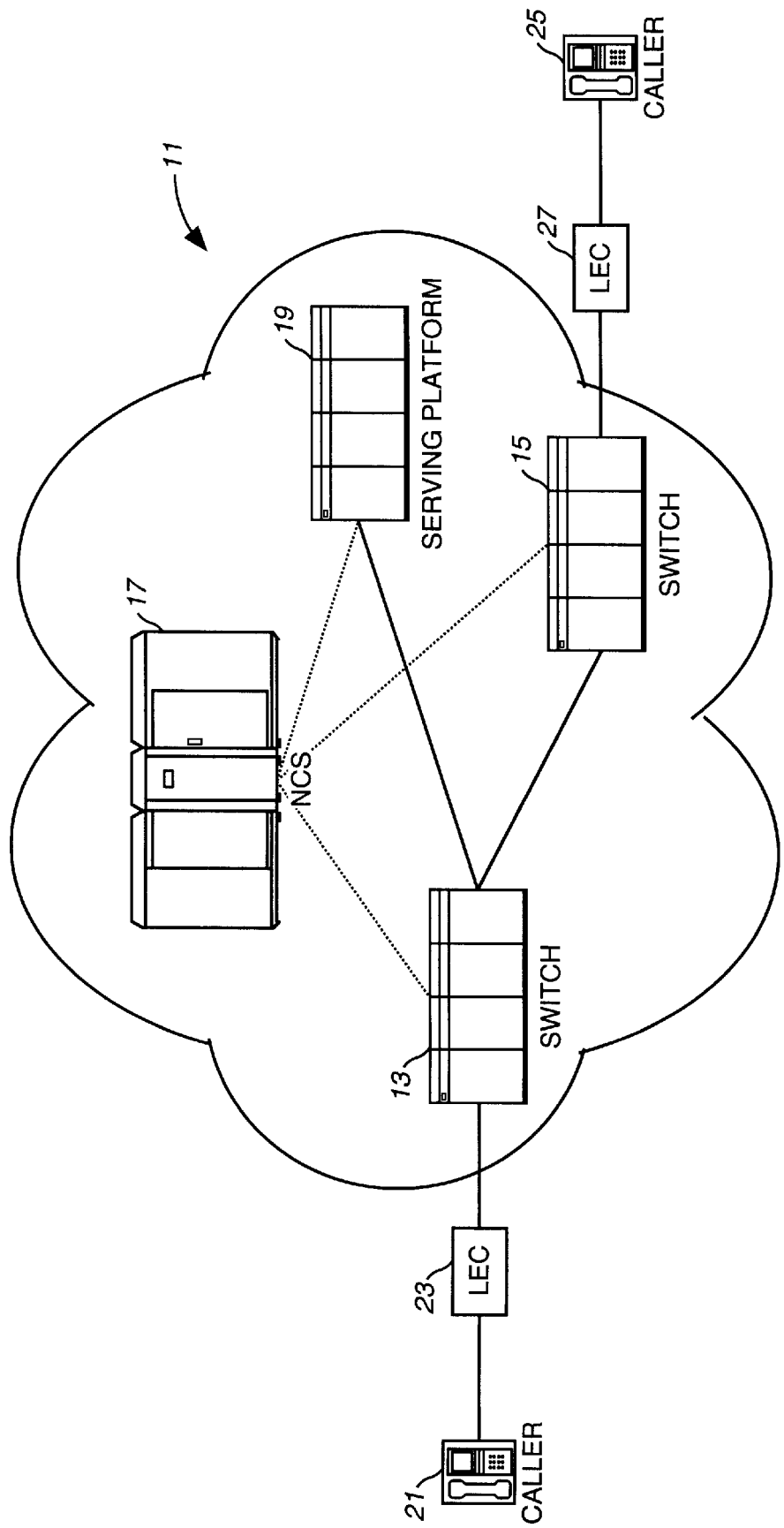
FIG. 1 is a block diagram illustrating a preferred embodiment of the system of the present invention.

Referring now to the drawings, and first to FIG. 1, a long distance telephone network is designated generally by the numeral 11. Long distance telephone network 11 includes a plurality of physically interconnected switches, including a first switch 13 and a second switch 15. Long distance telephone network 11 also includes a network control system (NCS) 17 that communicates with the switches of network 11 by suitable data links.

NCS 17 provides system management services to network 11. For example, NCS 17 can receive requests for routing instructions from the switches of network 11 and, in response to such requests provide routing instructions. NCS 17 also monitors and collects system performance data. Additionally, NCS 17 can provide restoration services in the event of the failure of a physical link between switches of network 11.

Network 11 also includes one or more serving platforms, including a serving platform 19. Serving platform 19 is physically connected to the switches of network 11 either directly or through intermediate switches. Serving platform 19 provides services such as conference calling, operator assistance, stock quotes, etc., according to the present invention.

Long distance telephone network 11 is adapted to transport long distance telephone calls between customers connected to local exchange carriers (LECs). For example, in FIG. 1, a first caller 21 is a customer of a first LEC 23, and a second caller 25 is a customer of a second LEC 27. If first caller 21 desires to place a long distance call to second caller 25, and first caller 21 is a customer of network 11, LEC 23 connects first caller 21 to first switch 13 of network 11. First switch 13 routes the call, either directly or indirectly through intermediate switches, to second switch 15, which routes the call to second caller 25 through LEC 27.

Call setup between first switch 13 and second switch 15 is preferably accomplished using the signalling system 7 (SS7) protocol. First switch 13 sends second switch 15 an initial address message (IAM) that, among other things, identifies the called party and assigns to the call a network call identifier (NCID). After the call between first party 21 and second party 25 is set up, the parties are connected until the call is terminated or interrupted.

According to the present invention, either caller 21 or second caller 25 can initiate interruption of their call. For example, in FIG. 1, first caller 21 may wish to access features such as conference calling, operator services, or stock quotes. According to the present invention, first caller 21 initiates an interrupt signal, which is a dual tone multi-frequency (DTMF) sequence. For example, the interrupt signal may be the DTMF sequence "12##." The ## sequence identifies the sequence as an interrupt signal and the preceding digits identify the type of services requested.

In the present invention, switch 13 monitors the call between first caller 21 and second caller 25 for party initiated party interrupt signals. When switch 13 detects an appropriate sequence of DTMF tones, it captures them and sends them to NCS 17 in an application data field (ADF) routing request message. NCS 17 responds to switch 13 with an ADF routing response, which contains routing instructions for establishing a new call to a serving platform 19. Upon receipt of routing instructions, the original call-between the parties is parked at switch 13 and a new call is initiated from switch 13 to serving platform 19. The new call is initiated with an IAM message that includes a network call identifier (NCID) that identifies the new call. The IAM message also includes the NCID of the original call so that the serving platform can identify the call for services requiring communication with the parked caller. The original call is parked at a port on the network side of switch 13 and first caller 21 is no longer connected to second caller 25. However, the original call between the parties remains in a billable state while second caller 25 is parked. A recorded announcement or music may be played to first caller 25 for the duration of the parked period.

After the new call is established and the original call is parked, switch 13 monitors the status of both the original call and the new call. In the event that a call leg is released or disconnected, switch 13 must take appropriate action. For example, if second caller 25 hangs up while the new call between first caller 21 and serving platform 19 is in progress, switch 13 must notify first caller 21 at the conclusion of the new call that second caller 25 has disconnected. Similarly, if first caller 21 hangs up before the completion of the new call, first switch 13 must notify second caller 25 that first caller 21 has disconnected. Finally, if serving platform 19 releases the new call, then, if the original call is still parked, i.e., first caller 25 has not disconnected, first switch 13 must reconnect first caller 21 and second caller 25 so that they may resume the original call.

Figure 2A:
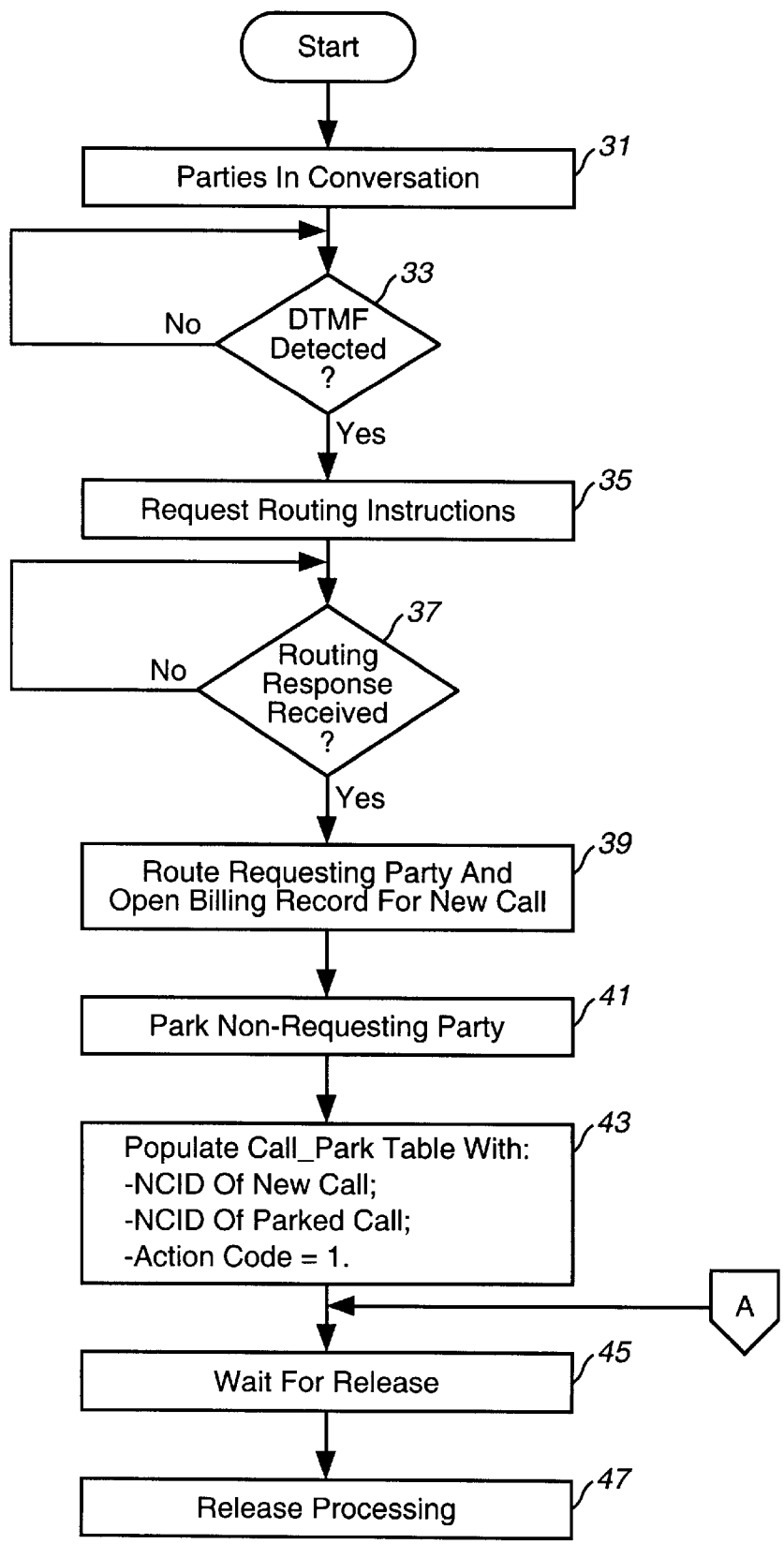
FIGS. 2A and 2B comprise a flowchart of a preferred implementation of the present invention.
Figure 2B:
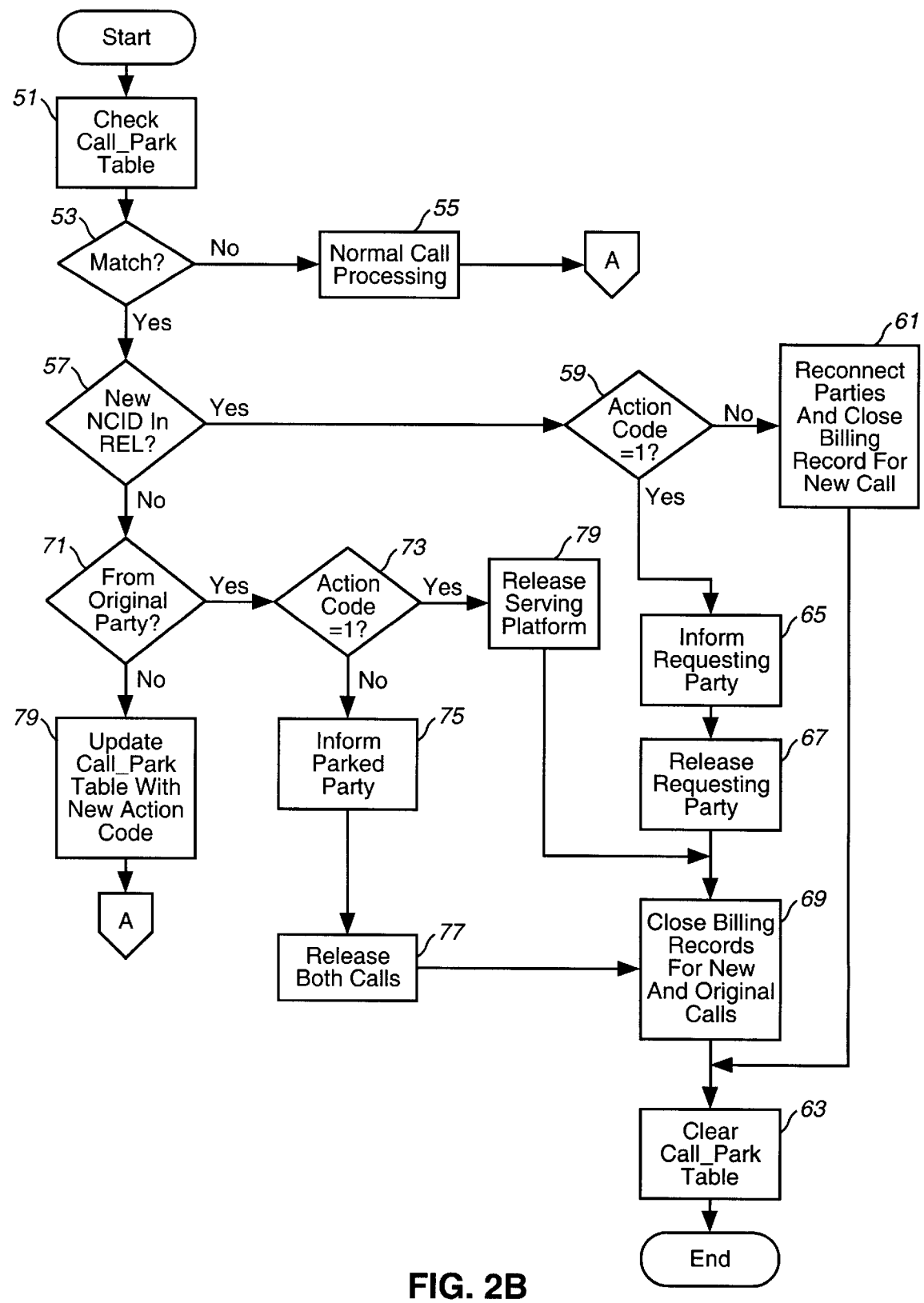

Processing at a monitoring switch, which in the example of FIG. 1 is switch 13, may be best understood with reference to the flowchart of FIGS. 2A and 2B. Referring first to FIG. 2A, the parties are in conversation as indicated generally at block 31. During the conversation, the monitoring switch waits for a party initiated interrupt signal, which in the preferred embodiment is a DTMF sequence. If, at decision block 33, the switch detects an appropriate DTMF sequence, the switch requests routing instructions from the network control system at block 35. When, at decision block 37, routing instructions are received, the switch routes the requesting party to a serving platform in accordance with the routing instructions and opens a billing record for the new call, at block 39. Additionally, the switch parks the nonrequesting party at block 41 and populates a call park table with certain information to identify and keep track of the parked original call and the new call, at block 43.

The call park table enables the switch, when it receives a release message, to determine whether or not a parked call is involved and, if so, what action to take. The call park table contains, for each parked call, the NCID of the new call, the NCID of the parked original call, and an action code, which identifies the status of the parked call. The NCID of the parked original call contains, among other things, the number of the port of the monitoring switch where the parked call is parked. In the preferred embodiment, the action code has two values, in which a first value denoted "0" indicates that the parked call is connected and a second value "1" indicates that the parked call is disconnected. The value of the action code is set to 1 when the call park table is populated.

After the switch has populated the call park table at block 43, the switch waits for a release message, at block 45, and performs release processing, indicated generally at block 47 and shown in detail in FIG. 2B.

Referring now to FIG. 2B, there is shown processing of a release message. The switch may be handling hundreds of calls simultaneously, so it typically receives release messages frequently. However, according to the present invention, the switch may receive a release message from serving platform 19 at the completion of the new call, or from second switch 15 if parked caller 25 disconnects, or from LEC 23 if requesting caller 21 disconnects.

A release message includes the NCID of the released call. Accordingly, the switch checks the call park table, at block 51, to determine whether or not there is a match between the NCID of the released call and the NCID of the new call or the NCID of the parked original call. If, at decision block 53, there is no match, then the switch performs normal processing of the released call, at block 55, and returns to block 45 of FIG. 2A.

If, at decision block 53, there is a match, the system test, at decision block 57, whether or not the NCID in the release message matches the new NCID. If so, the switch tests, at decision block 59, whether or not the action code in the call park table equals "1", which indicates that the parked party has disconnected. If not, the switch reconnects the callers and closes the billing record for the new call, at block 61. Then the switch clears the call park table entries for the original call at block 63. If, at decision block 59, the action code equals "1", which indicates that the parked party has disconnected, the switch delivers an announcement informing the requesting party that the parked party has disconnected, at block 65. Then the switch disconnects the requesting caller, at block 67, closes the billing records for the new and original calls, at block 69, and clears the call park table, at block 63.

If, at decision block 57, the NCID in the release message does not match the new NCID, which means that the NCID in the release message matches the NCID of the original call, the switch tests, at decision block 71, whether the release message is from the original party. If so, the switch tests, at decision block 73, whether or not the action code in the call park table equals "1", indicates that the parked party has disconnected. If not, the switch delivers an announcement informing the parked party that the original party has disconnected, at block 75. Then the switch releases both the new and original calls, at block 77, closes the billing records for the new and original calls, at block 69, and clears the call park table, at block 63. If, at decision block 73, the action code indicates that the parked party has already disconnected, the switch releases the serving platform, at block 79, closes the billing records for the new and original calls, at block 69, and clears the call park table, at block 63.

If, at decision block 71, the release message is not from the original party, which indicates that the parked caller has disconnected, the switch updates the call park table with a new action code equal to "1", at block 79, and returns to block 45 of FIG. 2A to wait for a release message from either the serving platform or the original party. If the serving platform disconnects, the release message will contain the new NCID, at decision block 57, and the action code will be "1", at decision block 59. Accordingly, the switch will inform the requesting party that the parked party has disconnected, at block 65, and complete processing of the call. If the requesting party disconnects, the release message will contain the original NCID, at decision block 57, and the action code will be "1", at decision block 73. Then, the switch will release the serving platform, at block 79, and complete processing of the call.

From the foregoing, those skilled in the art will recognize that the present invention provides call interrupt services in a switched telephone network. One party to a call is parked at a monitoring switch while the other party is connected to a serving platform. The monitoring switch maintains the status of both the parked call and the new call between the original party and the serving platform with a call park table. The monitoring switch processes release messages according information contained in the call park table.

What is claimed is:

1. A method of interrupting an original call between two parties in a switched telecommunications network, which comprises the steps of:

monitoring said original call at a switch of said network for a party initiated interrupt signal;

in response to detection of a party initiated interrupt signal from a requesting party at a monitoring switch, initiating a new call between the requesting party and a serving platform, and parking the other party at a port of said monitoring switch; and, monitoring at said monitoring switch the status of the new call between the requesting party and the serving platform, and the status of the parked original call.

2. The method as claimed in claim 1, including the steps of:

whenever the serving platform releases the requesting party, determining whether the parked party is still connected; and, whenever the parked party is still connected, reconnecting said requesting party and said parked party.

3. The method as claimed in claim 2, including the step of:

whenever the parked party is disconnected, informing the requesting party that the parked party has disconnected.

4. The method as claimed in claim 1, including the steps of:

whenever the requesting party disconnects, determining whether the parked party is still connected;

whenever the parked party is still connected, informing the parked party that the requesting party has disconnected.

5. The method as claimed in claim 1, including the steps of:

whenever the parked party disconnects, determining whether the requesting party is still connected;

whenever the requesting party is still connected, informing the requesting party that the parked party has disconnected when the serving platform releases the requesting party.

6. The method as claimed in claim 1, including the steps of:

inserting in a call park table an identifier identifying the original call between the parties, an identifier identifying the new call between the requesting party and the serving platform, and an action code that identifies the status of the parked call.

7. The method as claimed in claim 6, wherein said step of monitoring the status of the call between the party initiating the interrupt signal and the serving platform, and the status of the parked original call, includes the step of:

in response to receiving a release message containing an identifier of a released call at said monitoring switch, searching said call park table for a match between the identifier of the released call and the identifier of the original call between the parties or the identifier of the new call between the requesting party and the serving platform.

8. The method as claimed in claim 7, including the step of:

whenever the identifier of the released call matches the identifier of the new call between the requesting party and the serving platform, checking the action code to determine whether the parked party is still connected.

9. The method as claimed in claim 8, including the step of:

whenever the action code indicates the parked party is connected, reconnecting the requesting party and the parked party.

10. The method as claimed in claim 8, including the step of:

whenever the action code indicates parked party is disconnected, informing the requesting party that the parked party has disconnected.

11. The method as claimed in claim 7, including the step of:

whenever the identifier of the released call matches the identifier of the original call between the parties, determining whether the release message is from the original party or the parked party.

12. The method as claimed in claim 11, including the step of:
whenever the release message is from the parked party, updating the action code is said call park table to indicate that the parked party has disconnected.

13. The method as claimed in claim 11, including the step of:
whenever the release message is from the original party, checking the action code to determine whether the parked party is connected.

14. The method as claimed in claim 13, including the step of:
whenever the action code indicates that the parked party is connected, informing the parked party that the original party has disconnected.

15. The method as claimed in claim 1, wherein said switched telecommunications network is a long distance telephone network.

16. The method as claimed in claim 15, wherein each of said parties is connected to its associated switch of said long distance telephone network through a local exchange carrier.

17. The method as claimed in claim 1, wherein said step of monitoring said original call includes the step of receiving dual tone multi-frequency signals, and said step of initiating a call between a requesting party and a serving platform includes the step of requesting routing instructions from a network control system based on received dual tone multi-frequency signals.

18. The method as claimed in claim 1, including the step of maintaining the original call in a billable state at least until the new call is terminated.

19. The method as claimed in claim 18, wherein said new call and said original call each have a billing record associated therewith.

20. The method as claimed in claim 19, including the step of closing said billing record for said new call in response to reconnecting the parked party and the original party.

21. A method of interrupting an original call between two parties in a switched long distance telephone network, which comprises the steps of:
monitoring said original call at a monitoring switch of said network for a party initiated interrupt signal;
in response to detection of a party initiated interrupt signal from a requesting party at said monitoring switch, requesting routing instructions based on the detected party initiated interrupt signal;
initiating a call between the requesting party and a serving platform based on received routing instructions;
parking the original call at a port of said monitoring switch;
inserting in a call park table an identifier identifying the original call between the parties, an identifier identifying the new call between the requesting party and the serving platform, and an action code that identifies the status of the parked call; and,
monitoring at said monitoring switch the status of the new call between the requesting party and the serving platform, and the status of the parked original call.

22. The method as claimed in claim 21, wherein said step of monitoring the status of the new call between the party initiating the interrupt signal and the serving platform, and the status of the parked original call, includes the step of:
in response to receiving a release message containing an identifier of a released call at said monitoring switch, searching said call park table for a match between the identifier of the released call and the identifier of the original call between the parties or the identifier of the new call between the requesting party and the serving platform.

23. The method as claimed in claim 22, including the step of:
whenever the identifier of the released call matches the identifier of the new call between the requesting party and the serving platform, checking the action code to determine whether the parked party is connected.

24. The method as claimed in claim 23, including the step of:
whenever the action code indicates the parked party is connected, reconnecting the requesting party and the parked party.

25. The method as claimed in claim 23, including the step of:
whenever action code indicates the parked party is disconnected, informing the requesting party that the parked party has disconnected.

26. The method as claimed in claim 22, including the step of:
whenever the identifier of the released call matches the identifier of the original call between the parties, determining whether the release message is from the original party or the parked party.

27. The method as claimed in claim 26, including the step of:
whenever the release message is from the parked party, updating the action code is said call park table to indicate that the parked party has disconnected.

28. The method as claimed in claim 26, including the step of:
whenever the release message is from the original party, checking the action code to determine whether the parked party is connected.

29. The method as claimed in claim 28, including the step of:
whenever the action code indicates that the parked party is connected, informing the parked party that the original party has disconnected.

30. A switched telecommunications system, which comprises:
a network control system, said network control system including means for providing routing instructions in response to routing requests;
a serving platform, said platform including means for providing services to network customers;
a monitoring switch in said system, said monitoring switch including:
means for monitoring a call for a party initiated interrupt signal;
means responsive to detection of a party initiated interrupt signal from a requesting party for requesting routing instructions from said network control system based on the detected party initiated interrupt signal;
means for initiating a call between the requesting party and a serving platform based on received routing instructions;
means for parking the original call at a port of said monitoring switch;
means for inserting in a call park table an identifier identifying the original call between the parties, an identifier identifying the new call between the requesting party and the serving platform, and an action code that identifies the status of the parked call; and,
means for processing release messages according to said call park table.

* * * * *